US005781979A

United States Patent [19] Andrews

[11] Patent Number: 5,781,979

[45] Date of Patent: Jul. 21, 1998

[54] NIB CHANGING APPARATUS FOR A FOUNTAIN PEN AND METHOD

[75] Inventor: Neville Edgar Andrews, Horsham, United Kingdom

[73] Assignee: Parker Pen Products, Isleworth, England

[21] Appl. No.: 571,953

[22] PCT Filed: Jun. 24, 1994

[86] PCT No.: PCT/GB94/01371

§ 371 Date: Mar. 25, 1996

§ 102(e) Date: Mar. 25, 1996

[87] PCT Pub. No.: WO95/01881

PCT Pub. Date: Jan. 19, 1995

[30] Foreign Application Priority Data

Jul. 8, 1993 [GB] United Kingdom .................... 9314115

[51] Int. Cl.[6] .............................. B23P 6/00; B43K 23/12

[52] U.S. Cl. ....................... 29/402.08; 53/284.5; 401/243

[58] Field of Search ......................... 29/402.08; 401/243, 401/258; 53/284.5, 287, 489

[56] References Cited

U.S. PATENT DOCUMENTS

| | | | |
|---|---|---|---|
| 559,034 | 4/1896 | Laughlin . | |
| 3,463,323 | 8/1969 | Riepe | 401/243 |
| 3,767,035 | 10/1973 | Koelichen | 401/243 |
| 4,406,555 | 9/1983 | Tsai | 401/216 |
| 4,493,575 | 1/1985 | Mutschler | 401/195 |
| 4,595,308 | 6/1986 | Schienfnetter et al. | 401/243 |
| 4,610,556 | 9/1986 | Tsai | 401/18 |
| 4,892,428 | 1/1990 | Grötsch | 401/243 |
| 4,952,088 | 8/1990 | Groetsch | 401/243 |
| 4,981,383 | 1/1991 | Grötsch | 401/195 |
| 5,067,839 | 11/1991 | Felgentreu | 401/258 |

FOREIGN PATENT DOCUMENTS

| | | | |
|---|---|---|---|
| 620961 | 6/1927 | France . | |
| 2624437 | 12/1987 | France . | |
| 76324 | 1/1894 | Germany . | |
| 183303 | 12/1905 | Germany . | |
| 1246466 | 8/1967 | Germany . | |
| 2 109 467 | 9/1972 | Germany | 401/199 |
| 3637454 | 6/1988 | Germany . | |
| 3640517 | 6/1988 | Germany . | |
| 37 41 885 A1 | 6/1989 | Germany | 401/258 |
| 51-21778 | 6/1976 | Japan | 401/199 |
| 64-85799 | 3/1989 | Japan | B43K 5/00 |

*Primary Examiner*—P. W. Echols
*Attorney, Agent, or Firm*—David A. Howley; Chester Cekala

[57] ABSTRACT

A nib changing apparatus for a fountain pen includes a tubular container having an opening at each end. A pair of end closures are each adapted to fit onto the end of the container. The end closures each include a socket configured to receive and engage a fountain pen nib in order to retain the nib therein.

6 Claims, 3 Drawing Sheets

NIB CHANGING APPARATUS FOR A FOUNTAIN PEN AND METHOD

The present invention relates to a nib changing apparatus for a fountain pen and, more particularly, to an apparatus which can also provide packaging for a fountain pen nib.

Nibs for fountain pens are often packaged in tubes or other similar containers and obviously have to be removed from the container before they can be inserted in a fountain pen. Unfortunately, this is often a somewhat messy operation as the nib which is being replaced usually contains ink and, since it has to be grasped by the operator, usually therefore leaves ink on the fingers of the operator.

The present invention is aimed at providing apparatus which renders the operation considerably less messy and which can also be used to provide packaging for a new nib and for a nib which has been replaced.

According to the present invention there is provided a nib changing apparatus for a fountain pen which comprises a tubular container having an opening at each end, and a pair of end closures, each of which is adapted to fit onto the end of the tubular container and each of which includes a socket configured to receive and engage a fountain pen nib in order to retain the nib therein.

By means of this apparatus a fountain pen nib can be stored within the tubular container, held by one of the end closures until such time as it is required to replace an existing nib. The end closure which is not being used to hold the nib within the container can then be removed from the tubular container, engaged with the nib which is to be replaced and then used to unscrew and remove that nib. The replacement nib, gripped by the other end closure, can then be removed from the container and inserted in the pen, whereafter the end closure can be removed from the nib and re-fixed to the end of the tubular container, after which the old nib, mounted on its end closure can then be put into the container and the other end closed. Since the operator only has to manipulate the container and end closures, his or her fingers never have to come into contact with the nib itself and therefore there is no risk of ink bleeding from the nib onto the user's fingers.

Preferably, each of the end closures has a socket which is closely configured to the shape of a particular style of nib, i.e. one for a particular fountain pen, but it is within the scope of the invention for the end closures to be adapted for use with a range of different pen nibs.

Preferably each of the end closure sockets includes a key or detent which mates with a corresponding keyway or slot in the fountain pen nib in order to fix the nib in a given angular position within the end closure so that unnecessary force does not have to be applied to the end closure to grip the nib when it is being screwed into or out of the fountain pen.

The end closures may be of different colours to simplify the operation for the user and so that the user can be guided through the steps for using the apparatus by a simple set of linked diagrams.

The end closures are preferably an interference fit within the end of the tubular container, which may be a simple transparent plastics tube, the end closures each having an elongate spigot which fits within the end of the tubular container and which forms the outside of the socket for the fountain pen nib, and a larger diameter end portion which provides a gripping portion for the user. The elongate spigot may be provided with a number of angularly disposed ribs which provide the interference fit with the internal diameter of the tubular container and the spigot may be provided with one or more axial slots to allow a degree of flexing of the socket for securing the nib within it.

To aid engagement of the end closure with a fountain pen nib a relief pattern may be formed on the end closure in the shape of a nib to indicate the correct orientation of the end closure with the nib.

One example of apparatus in accordance with the present invention will now be described with reference to the accompanying drawings in which.

Figure 1:
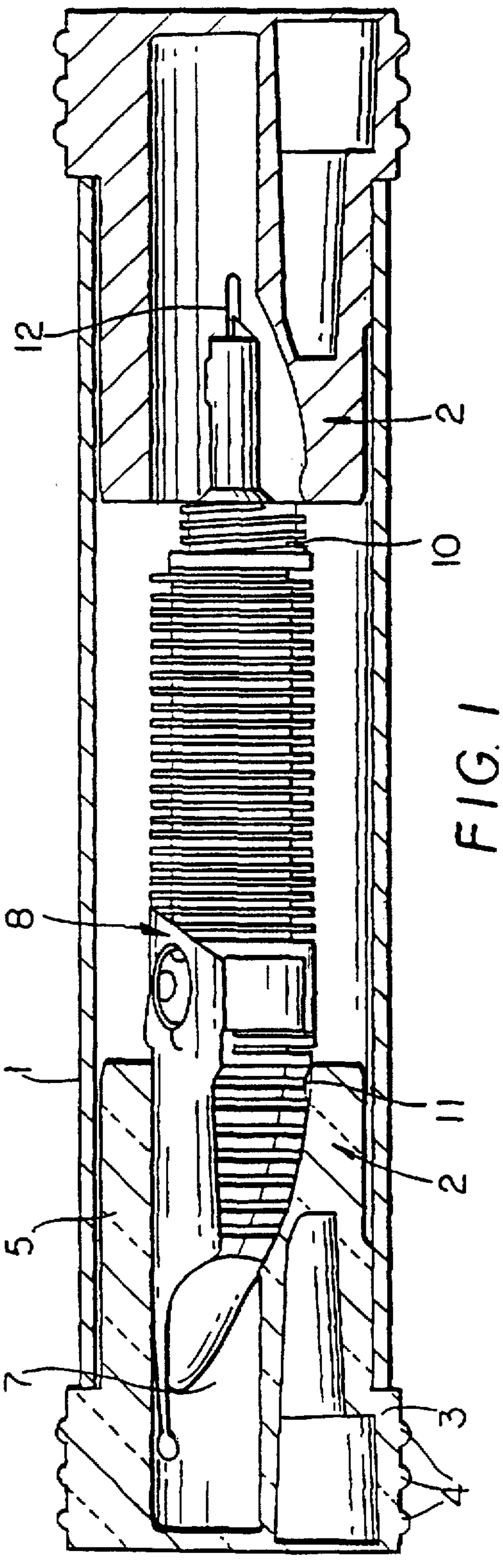
FIG. 1 is an assembled part-sectional view of the apparatus with a fountain pen nib being shown mounted therein.
Figure 3:
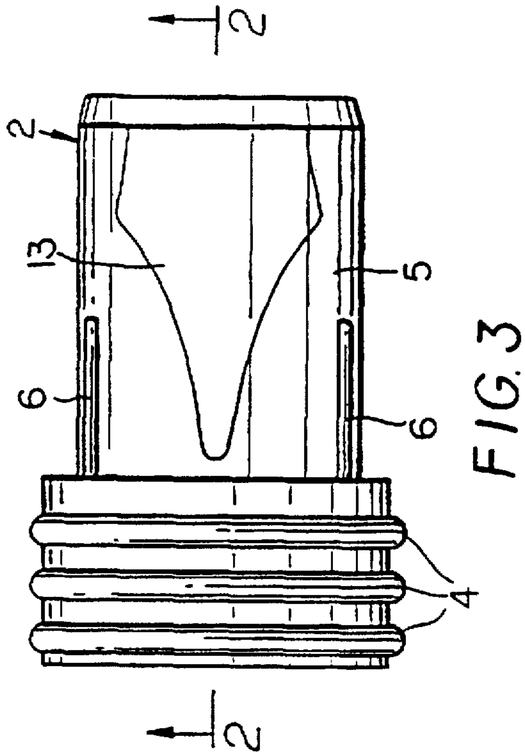
FIG. 3 is a side elevation of the end closure.
Figure 2:
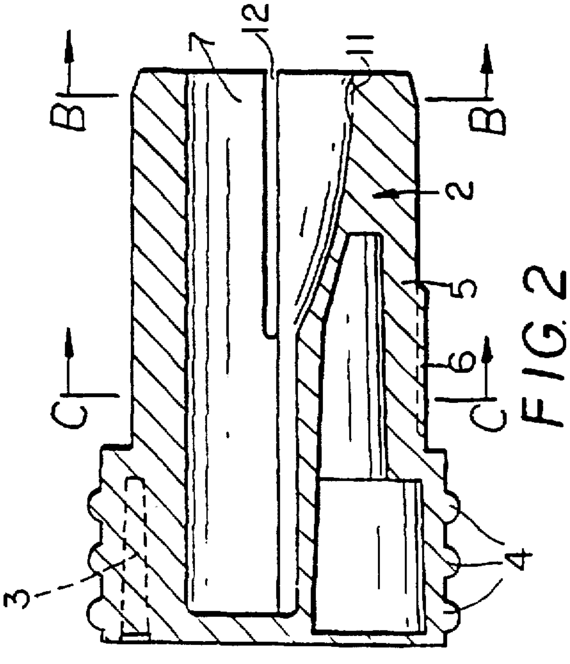
FIG. 2 is an axial section through an end closure.
Figure 4:
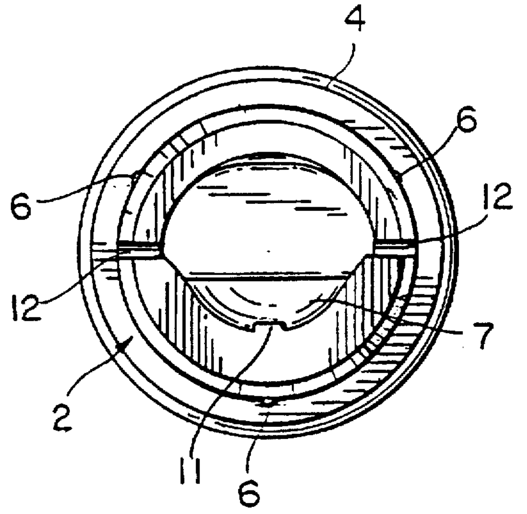
FIGS. 4, 5, 6 and 7 are, respectively, end views of the end closure and cross-sections on the planes C—C and B—B in FIG. 2; and, FIG. 8 is a series of perspective views showing the nib-changing procedure in stages.
Figure 5:
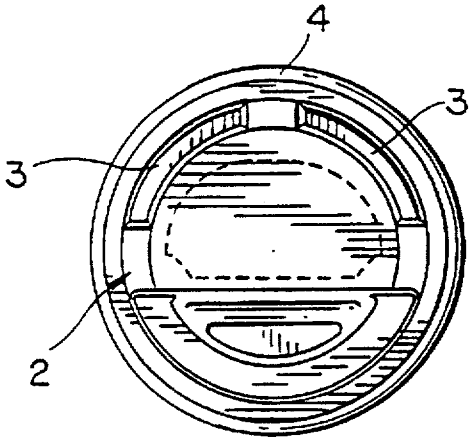
Figure 6:
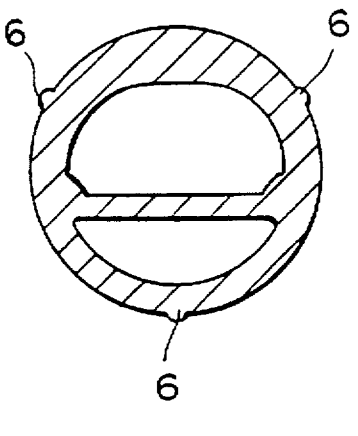
Figure 7:
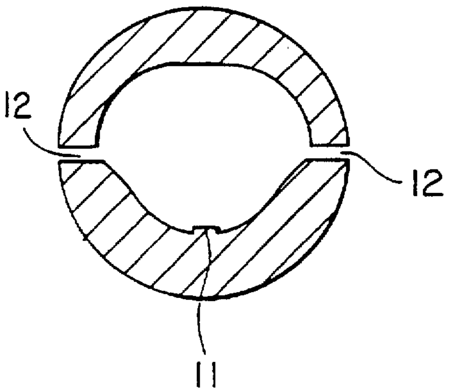

The apparatus comprises a transparent plastics tube 1 and a pair of identically shaped end closures 2, one of which is formed of a clear plastics material and the other one of which is formed of an opaque plastics.

As the end closures are identical in shape only one of them will be described in detail.

The end closure comprises a gripping portion 3 which has raised annular ribs 4 and an elongate spigot portion 5 which has three axial ribs 6 fixed disposed equi-angularly about its circumference and which provide an interference fit with the internal diameter of the tube 1 in order to use the resilience of the tube 1 to secure the end closure within the end of the tube.

Each spigot 5 has a socket 7 formed within it of a shape which is arranged to match that of the end portion of a nib 8 of a fountain pen 9. The socket 7 is closed at the end of the closure which, in use, is outermost, so that the end closures fully close the interior of the tube 1. Although, as best seen in FIGS. 4 to 7, the cross-sectional shape of the socket 7 is such as to closely match the end of the nib 8, since the end of the nib 8 is screw-threaded into engagement with the fountain pen 9 by means of a screw thread 10 on the nib and a complementary one (not shown) on the fountain pen, a detent or key 11 is provided at the entrance to the socket 7, for mating engagement with an axial groove which is formed along the underside of the nib 8.

The spigot 5 has a pair of diametrically opposed axial slots 12 which extend through the collector portion and which allow the spigot to flex both to accommodate the nib 8 and to cause it to be securely gripped.

A relief pattern 13 in the shape of a pen nib is formed on one side of the end closure 2 in order to provide an indication of the correct orientation of the nib with the end closure.

Figure 8:
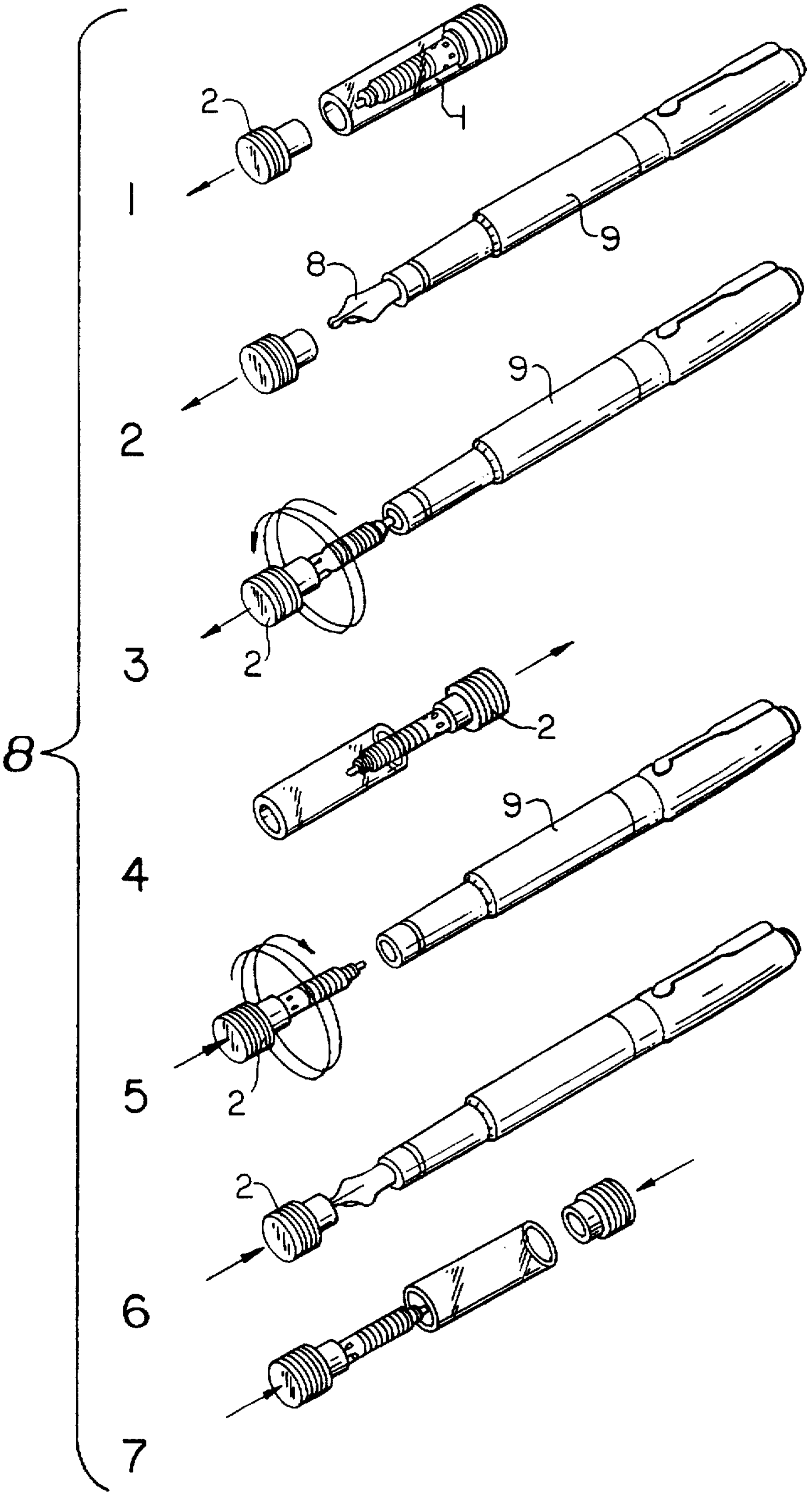

In use the apparatus is used as shown in the series of numbered steps in FIG. 8. In the first step a first end closure 2 (in this case the opaque one) is removed from the end of the tube 1 and then in step 2 it is pushed over the end of the nib 8 which is mounted in the fountain pen 9 and which is to be replaced. In step 3 the end closure is rotated, thus unscrewing the nib which is then removed. As the end of the end closure is a flat surface it can then be stood up on a flat surface temporarily. In step 4 the other end closure 2 is removed from the tube 1, carrying the replacement nib 8 with it. As shown in step 5 this is inserted into the end of the fountain pen 9 and is screwed up into engagement with it. In step 6 the end closure 2 is removed and in step 7 both end closures are then re-fitted to the tube 1, the opaque end closure retaining the replaced nib therein. The replaced nib can then be returned for repair or replacement or disposed of.

It will be appreciated that the use of the end closure as a gripper for the nib avoids the user from having to handle the nib directly and therefore avoids ink bleeding onto the user's fingers.

I claim:

1. A method of replacing a used pen nib with a new pen nib, comprising the steps of:

providing a new pen nib having a writing end and a threaded end;

providing a tube having two ends;

providing two spigots, one spigot operatively engaged to each end of said tube, each spigot having a shaped-opening socket defined therein for operatively engaging the writing end of said new or said used pen nib therein, said sockets facing each other when said spigots are operatively engaged to said tube, one of said spigots being operatively engaged to the writing end of said new pen nib, said new pen nib being enclosed by said spigots and said tube;

removing said spigots from said tube;

providing a writing instrument having a used pen nib threadedly engaged at one end thereof;

operatively engaging the other of said spigots removed from said tube to the writing end of said used pen nib;

rotating said other spigot to disengage said used pen nib from threaded engagement with said writing instrument; and rotating said one spigot and said new pen nib operatively engaged thereto relative to said writing instrument to operatively engage said new pen nib to said writing instrument.

2. The method of claim 1, further including the step of:

disengaging the writing end of said new pen nib from engagement with said one spigot.

3. The method of claim 2, further comprising the step of:

replacing said spigots in said tube, said other spigot being operatively engaged to said old pen nib which is enclosed within said tube.

4. An apparatus for cleanly interchanging new and used pen nibs, comprising;

a new pen nib having two ends, a writing nib end and a threaded end and a central longitudinal axis defined therebetween, said nib end having an axial groove formed along the underside thereof, a first spigot having a shaped opening socket defined therein for operatively engaging the writing end of said new pen nib, said first spigot having a plurality of ribs spaced equidistant about the outer periphery thereof and extending parallel to said central longitudinal axis, a second spigot having a shaped opening socket defined therein for operatively engaging the writing end of said new pen nib, said second spigot having a plurality of ribs spaced equidistant about the outer periphery thereof and extending parallel to said central longitudinal axis, and a tube having two ends and a circular opening defined therethrough, the inner diameter of said tube sized to receive one spigot in each end therein, the length of said tube sized to accept said new pen nib between said shaped openings of both of said spigots when each of said spigots are inserted in each end of said tube facing one another.

5. The apparatus of claim 4 wherein said ribs spaced equidistant about the periphery of said spigot are sized to form an interference fit with said tube inner diameter.

6. An apparatus for cleanly interchanging new and used pen nibs, comprising:

a new pen nib having a writing end and a threaded end;

a first spigot having a shaped opening socket therein for operatively engaging the writing end of the new pen nib;

a second spigot having a shaped opening socket defined therein for operatively engaging a writing end of a used pen nib;

a tube having two ends and an opening defined therethrough, the ends of the tube being sized such that the spigots can be removably secured to respective ends of the tube, the length of the tube being sized to accept the new pen nib therein when the spigots are removably secured to respective ends of the tube.

* * * * *

UNITED STATES PATENT AND TRADEMARK OFFICE

CERTIFICATE OF CORRECTION

PATENT NO. : 5,781,979

DATED : Jul. 21, 1998

INVENTOR(S) : Neville Edgar Andrews

It is certified that error appears in the above-identified patent and that said Letters Patent is hereby corrected as shown below:

In column 4, line 18, the word "new" should be replaced with the word—used--.

Signed and Sealed this

Twenty-ninth Day of December, 1998

Attest:

BRUCE LEHMAN

*Attesting Officer* *Commissioner of Patents and Trademarks*